United States Patent
Gordon et al.

(10) Patent No.: US 9,104,961 B2
(45) Date of Patent: Aug. 11, 2015

(54) MODELING A DATA GENERATING PROCESS USING DYADIC BAYESIAN MODELS

(71) Applicant: Microsoft Corporation, Redmond, WA (US)

(72) Inventors: Andrew D. Gordon, Cambridge (GB); Thore Graepel, Cambridge (GB); Aditya Nori, Bangalore (IN); Sriram Rajamani, Bangalore (IN); Johannes Borgstroem, Stockholm (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 335 days.

(21) Appl. No.: 13/646,739

(22) Filed: Oct. 8, 2012

(65) Prior Publication Data

US 2014/0101090 A1    Apr. 10, 2014

(51) Int. Cl.
*G06N 7/00*    (2006.01)
*G06N 5/04*    (2006.01)
*G06N 99/00*    (2010.01)

(52) U.S. Cl.
CPC ............... *G06N 7/005* (2013.01); *G06N 5/048* (2013.01); *G06N 99/005* (2013.01)

(58) Field of Classification Search
None
See application file for complete search history.

(56) References Cited

U.S. PATENT DOCUMENTS

| 7,650,272 | B2 | 1/2010 | Przytula et al. |
| 7,984,002 | B2 | 7/2011 | Cox |
| 2007/0239431 | A1* | 10/2007 | Lin et al. ............ 704/9 |
| 2010/0293134 | A1* | 11/2010 | Von Sydow ............ 706/55 |
| 2012/0185728 | A1 | 7/2012 | Guo et al. |

FOREIGN PATENT DOCUMENTS

WO    2009/010293 A2    1/2009

OTHER PUBLICATIONS

"A sample-based introduction to the basics of Microsoft Infer.NET programming", Received at <<http://research.microsoft.com/en-us/um/cambridge/projects/infernet/docs/InferNet101.pdf>>, Oct. 11, 2011, pp. 71.

(Continued)

*Primary Examiner* — Kakali Chaki
*Assistant Examiner* — Mai T Tran
(74) *Attorney, Agent, or Firm* — Gregg Wisdom; Stein Dolan; Micky Minhas

(57) ABSTRACT

There is provided a method and system for modeling a data generating process. The method includes generating a dyadic Bayesian model including a pair of probabilistic functions representing a prior distribution and a sampling distribution, and modeling a data generating process based on the dyadic Bayesian model using observed data. The method includes generating a learner object for the dyadic Bayesian model. The method further includes training the dyadic Bayesian model with the learner object based on the observed data to produce a trained dyadic Bayesian model. The method also includes generating a posterior distribution over parameters based on the trained dyadic Bayesian model. The method also further includes generating a posterior predictive distribution based on the posterior distribution. The method also includes predicting an outcome of observable variables based on the posterior predictive distribution.

20 Claims, 4 Drawing Sheets

(56) References Cited

OTHER PUBLICATIONS

Best, et al, "Introduction to Bayesian Analysis using WINBUGS", Retrieved at <<http://www.bias-project.org.uk/WB2011Man/bayes-intro-2011-slides.pdf>>, Proceedings of Economic & Social Research Council, Feb. 16, 2011, pp. 160.

"Bayesian model fitting and prior selection", Retrieved at <<http://psignifit.sourceforge.net/BAYESINTRO.html>>, Retrieved Date: Jul. 24, 2012, pp. 6.

Shi, et al., "Exemplar models as a mechanism for performing Bayesian inference", Retrieved at <<http://cocosci.berkeley.edu/tom/papers/mechanism.pdf>>, Proceedings of University of California, Aug. 2010, pp. 58.

Bhat, et al., A Type Theory for Probability Density Functions, Retrieved at <<http://ashishagarwal.org/wp-content/uploads/2011/10/popI2012_camera-ready.pdf>>, In Proceedings of the 39th Annual ACM SIGPLN-SIGACT Symposium on Principles of Programming Languages, Jan. 25, 2012, pp. 12.

Borgstrom, et al., "Measure Transformer Semantics for Bayesian Machine Learning", Retrieved at <<http://www.cis.upenn.edu/~mgree/papers/esop2011_mts.pdf>>, In Proceedings of the 20th European Conference on Programming Languages and Systems: Part of the Joint European Conferences on Theory and Practice of Software, vol. 6602, Mar. 26, 2011, pp. 20.

Goodman, et al., "Church: A Language for Generative Models", Retrieved at <<http://citeseerx.ist.psu.edu/viewdoc/download?doi=10.1.1.151.7160&rep=rep1&type=pdf>>, In Proceedings of the 24th Conference in Uncertainty in Artificial Intelligence, Jul. 9, 2008, pp. 10.

Minka, et al., "Gates", Retrieved at <<http://books.nips.cc/papers/files/nips21/NIPS2008_0875.pdf>>, In Proceedings of the Twenty-Second Annual Conference on Neural Information Processing Systems, Dec. 8, 2008, pp. 8.

Ramsey, et al., "Stochastic Lambda Calculus and Monads of Probability Distributions", Retrieved at <<http://www.cs.tufts.edu/~nr/pubs/pmonad.pdf, In Proceedings of the 29th ACM SIGPLAN-SIGACT Symposium on Principles of Programming Languages, Jan. 16, 2002, pp. 12.

Solovay, Robert M., "A Model of Set-Theory in Which Every Set of Reals is Lebesgue Measurable", Retrieved at <<http://www.math.wisc.edu/~miller/old/m873-03/solovay.pdf>>, In the Annals of Mathematics, Second Series, vol. 92, No. 1, Jul. 1970, pp. 57.

"International Search Report & Written Opinion for PCT Application No. PCT/US2013/060237", Mailed Date: Jul. 29, 2014, Filed Date: Sep. 18, 2013, 9 Pages.

Meeds, et al., "Modeling Dyadic Data with Binary Latent Factors", Published on: Dec. 31, 2006, Available at: http://machinelearning.wustl.edu/mlpapers/paper_files/NIPS2006_716.pdf, 8 pages.

\* cited by examiner

300

400

MODELING A DATA GENERATING PROCESS USING DYADIC BAYESIAN MODELS

BACKGROUND

Probabilistic programming language systems provide for automatic generation of machine-learning algorithms. The user may write a short probabilistic program, often embedded within a larger conventional program, and the system may produce an algorithm for learning distributions given by the probabilistic program. Hence, probabilistic programming saves development costs compared to the alternative of manually writing the inference algorithm. In addition, probabilistic programming is more flexible than the alternative of relying on a fixed algorithm for a particular task, since variations of models with slightly different structures may be easily written.

However, the current practice of probabilistic programming is low-level, irregular, and unstructured. Probabilistic programs may represent Bayesian models, but they often lack a structure for defining the parameters, predicting the outputs, and observing the data. The absence of such structure prevents the re-use of code for performing standard tasks, such as training, parameter learning, and prediction. Moreover, there is a lack of structure for constructing mixture models, performing model selection, or implementing other repetitive probabilistic patterns. Therefore, it may be desirable to write Bayesian models in a generic format including a defined structure.

SUMMARY

The following presents a simplified summary of the subject innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

An embodiment provides a method for modeling a data generating process. The method includes generating a dyadic Bayesian model including a pair of probabilistic functions representing a prior distribution and a sampling distribution, and modeling a data generating process based on the dyadic Bayesian model using observed data. The method includes generating a learner object for the dyadic Bayesian model. The method further includes training the dyadic Bayesian model with the learner object based on the observed data to produce a trained dyadic Bayesian model. The method also includes generating a posterior distribution over parameters based on the trained dyadic Bayesian model. The method also further includes generating a posterior predictive distribution based on the posterior distribution. The method also includes predicting an outcome of observable variables based on the posterior predictive distribution.

Another embodiment provides a system for modeling a data generating process. The system includes a processor that is adapted to execute stored instructions and a system memory. The system memory includes code configured to generate a dyadic Bayesian model including a pair of probabilistic functions representing a prior distribution and a sampling distribution, a sampler object, and a learner object. The system memory also includes code configured to train the dyadic Bayesian model based on observed data with the learner object to produce a trained dyadic Bayesian model. The system memory further includes code configured to generate a posterior distribution over parameters based on the trained dyadic Bayesian model, generate a posterior predictive distribution based on the posterior distribution, and predict a distribution of observable variables using the posterior predictive distribution.

In addition, another embodiment provides one or more computer-readable storage media including instructions that, when executed by a processor, cause the processor to generate a dyadic Bayesian model including a pair of probabilistic functions representing a prior distribution and a sampling distribution from one or more previously-generated dyadic Bayesian models using a model combinator. The instructions also cause the processor to model a data generating process by transforming data according to the dyadic Bayesian model. The instruction also cause the processor to generate a learner object for the dyadic Bayesian model. The instruction further cause the processor to train the dyadic Bayesian model with the learner object based on the observed data to produce a trained dyadic Bayesian model. The instruction also further cause the processor to generate a posterior distribution over parameters based on the trained dyadic Bayesian model. The instruction also cause the processor to generate a posterior predictive distribution based on the posterior distribution. The instruction further cause the processor to predict an outcome of observable variables based on the posterior predictive distribution.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Overview

Figure 1:
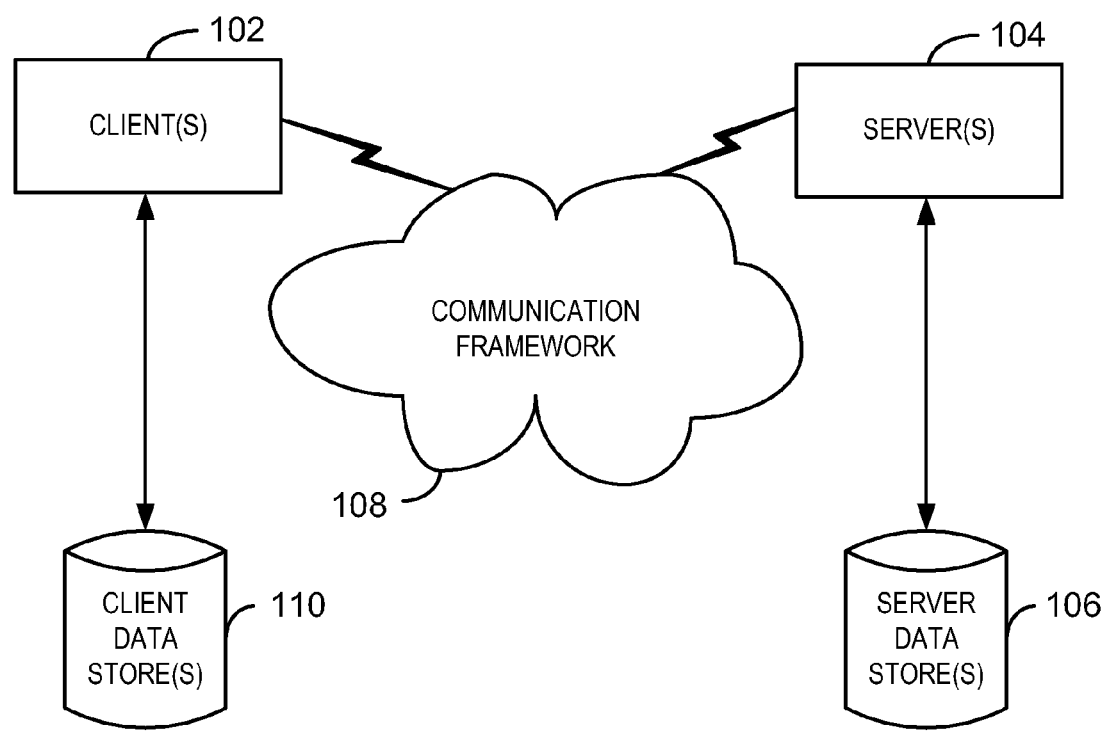
FIG. 1 is a block diagram of a networking environment in which a system and method for modeling a data generating process may be implemented.

A Bayesian model includes a pair of probability distributions, known as the prior and sampling distributions. For a general Bayesian model, the term y may represent the output of the model, which may be the object to be predicted or observed, and the term x may represent any input information on which to condition the model, such as the feature vector in classification or regression. The term w may represent the parameters for the model, and the term h may represent the hyperparameters for the model.

The Bayesian model may include two conditional probability distributions. Specifically, the Bayesian model may include a prior distribution on the parameters, i.e., $p(w|h)$, and a sampling distribution on the output, i.e., $p(y|x,w)$. Given a set of training data d=(x,y), Bayes' rule expressions may be obtained for computing a posterior distribution p(w|d,h) and a posterior predictive distribution p(y'|x',d,h), assuming that (x',y') are independent from and identically distributed as (x,y). This Bayesian model represents a wide variety of machine learning tasks. There are also many machine learning algorithms for probabilistic inference, that is, for computing approximately the posterior distribution p(w↑d,h) and for using the posterior predictive distribution p(y'|x',d,h) to make predictions.

Embodiments described herein relate to a new probabilistic programming abstraction, referred to as a "dyadic Bayesian model," which is a pair of probabilistic functions for the prior and sampling distributions. A sampler object, i.e., sampler, for a model is an algorithm to compute synthetic data from the model, while a learner object, i.e., learner, for a model is an algorithm for probabilistic inference on the model. Models, samplers, and learners support the uniform expression of common tasks, such as model testing, mixture model creation, and evidence-based model selection.

According to embodiments described herein, a Bayesian model is represented by a generic type, i.e., Model <TH, TW, TX, TY>, in order to provide for added structure and code re-use for probabilistic programming applications. Such a dyadic Bayesian model includes a pair of probabilistic functions for the prior and sampling distributions. In some embodiments, a default hyperparameter may be packaged with the prior and sampling distributions as part of the model. The type parameters, i.e., TH, TW, TX, TY, correspond to the constituents of a Bayesian model. Specifically, the type parameter TH corresponds to the hyperparameters h, and the type parameter TW corresponds to the parameters w. In addition, the type parameter TX corresponds to the inputs x, and the type parameter TY corresponds to the outputs y.

Common patterns of constructing Bayesian models can be written as functions on such dyadic Bayesian models. For example, given any Bayesian model, a sampler object and a learner object can be derived. The sampler object may include general techniques for drawing samples from the prior and sampling distributions, for test purposes. The learner object may include general techniques for training on given data, as well as general techniques for computing the posterior distribution and posterior predictive distribution for the model.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Computing Environment

Figure 2:
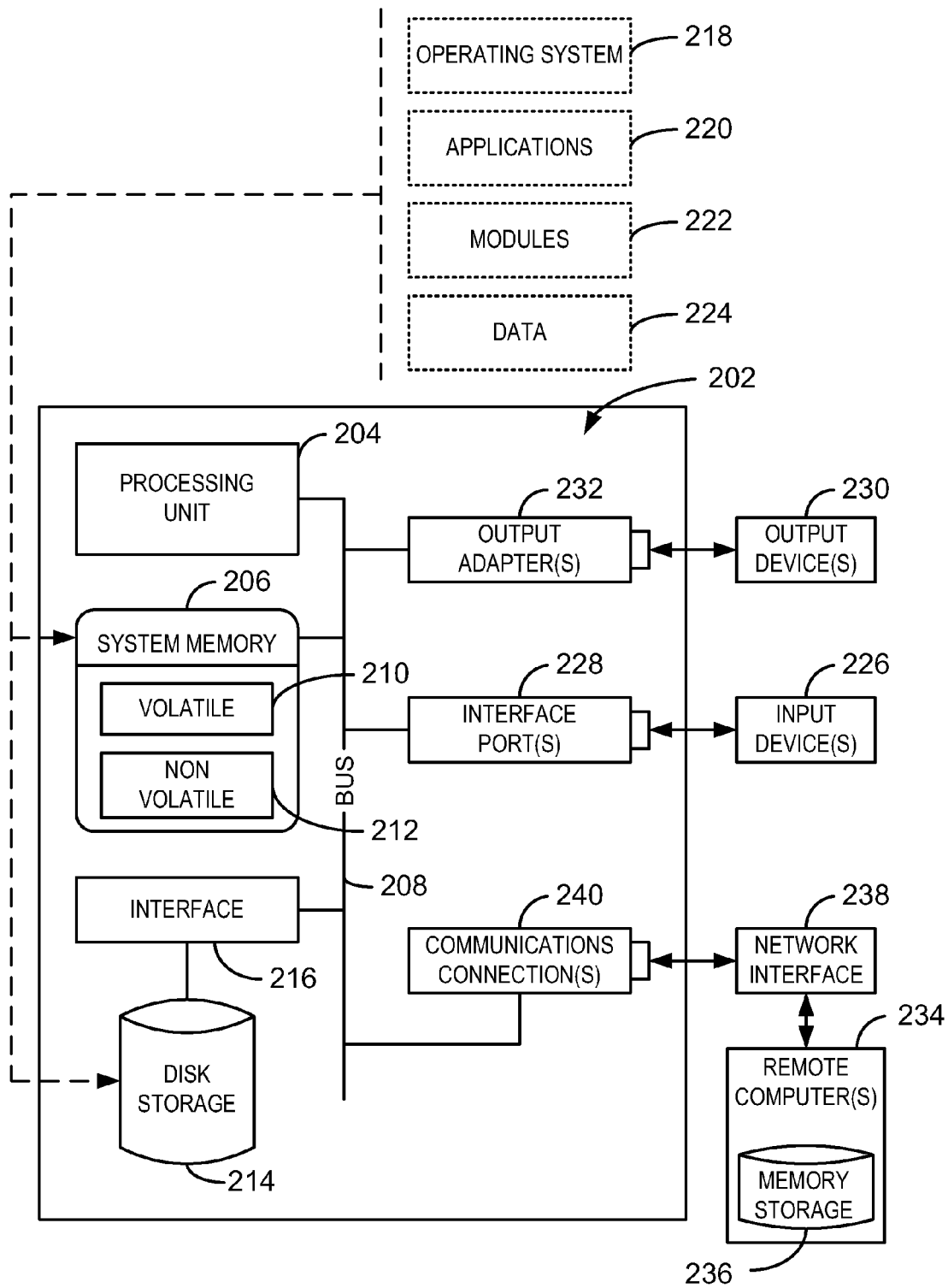
FIG. 2 is a block diagram of a computing environment that may be used to implement a system and method for modeling a data generating process.

In order to provide context for implementing various aspects of the claimed subject matter, FIGS. 1-2 and the following discussion are intended to provide a brief, general description of a computing environment in which the various aspects of the subject innovation may be implemented. For example, a method and system for modeling a data generating process can be implemented in such a computing environment. While the claimed subject matter has been described above in the general context of computer-executable instructions of a computer program that runs on a local computer or remote computer, those of skill in the art will recognize that the subject innovation also may be implemented in combination with other program modules. Generally, program modules include routines, programs, components, data structures, etc., that perform particular tasks or implement particular abstract data types.

Moreover, those of skill in the art will appreciate that the subject innovation may be practiced with other computer system configurations, including single-processor or multiprocessor computer systems, minicomputers, mainframe computers, as well as personal computers, hand-held computing devices, microprocessor-based or programmable consumer electronics, and the like, each of which may operatively communicate with one or more associated devices. The illustrated aspects of the claimed subject matter may also be practiced in distributed computing environments wherein certain tasks are performed by remote processing devices that are linked through a communications network. However, some, if not all, aspects of the subject innovation may be practiced on stand-alone computers. In a distributed computing environment, program modules may be located in local or remote memory storage devices.

FIG. 1 is a block diagram of a networking environment 100 in which a system and method for modeling a data generating process may be implemented. The networking environment 100 includes one or more client(s) 102. The client(s) 102 can be hardware and/or software (e.g., threads, processes, or computing devices). The networking environment 100 also includes one or more server(s) 104. The server(s) 104 can be hardware and/or software (e.g., threads, processes, or computing devices). The servers 104 can house threads to perform search operations by employing the subject innovation, for example.

One possible communication between a client 102 and a server 104 can be in the form of a data packet adapted to be transmitted between two or more computer processes. The networking environment 100 includes a communication framework 108 that can be employed to facilitate communications between the client(s) 102 and the server(s) 104. The client(s) 102 are operably connected to one or more client data store(s) 110 that can be employed to store information local to the client(s) 102. The client data store(s) 110 may be stored in the client(s) 102, or may be located remotely, such as in a cloud server. Similarly, the server(s) 104 are operably connected to one or more server data store(s) 106 that can be employed to store information local to the servers 104.

FIG. 2 is a block diagram of a computing environment that may be used to implement a system and method for modeling a data generating process. The computing environment 200 includes a computer 202. The computer 202 includes a processing unit 204, a system memory 206, and a system bus 208. The system bus 208 couples system components including, but not limited to, the system memory 206 to the processing unit 204. The processing unit 204 can be any of various available processors. Dual microprocessors and other multiprocessor architectures also can be employed as the processing unit 204.

The system bus 208 can be any of several types of bus structures, including the memory bus or memory controller, a peripheral bus or external bus, or a local bus using any variety of available bus architectures known to those of ordinary skill in the art. The system memory 206 is computer-readable storage media that includes volatile memory 210 and non-volatile memory 212. The basic input/output system (BIOS), containing the basic routines to transfer information between elements within the computer 202, such as during start-up, is stored in non-volatile memory 212. By way of illustration, and not limitation, non-volatile memory 212 can include read-only memory (ROM), programmable ROM (PROM), electrically-programmable ROM (EPROM), electrically-erasable programmable ROM (EEPROM), or flash memory.

Volatile memory 210 includes random access memory (RAM), which acts as external cache memory. By way of illustration and not limitation, RAM is available in many forms, such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 202 also includes other computer-readable storage media, such as removable/non-removable, volatile/non-volatile computer storage media. FIG. 2 shows, for example, a disk storage 214. Disk storage 214 includes, but is not limited to, devices like a magnetic disk drive, floppy disk drive, tape drive, Jaz drive, Zip drive, LS-100 drive, flash memory card, or memory stick.

In addition, disk storage 214 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 214 to the system bus 208, a removable or non-removable interface is typically used, such as interface 216.

It is to be appreciated that FIG. 2 describes software that acts as an intermediary between users and the basic computer resources described in the computing environment 200. Such software includes an operating system 218. The operating system 218, which can be stored on disk storage 214, acts to control and allocate resources of the computer 202.

System applications 220 take advantage of the management of resources by the operating system 218 through program modules 222 and program data 224 stored either in system memory 206 or on disk storage 214. It is to be appreciated that the claimed subject matter can be implemented with various operating systems or combinations of operating systems.

A user enters commands or information into the computer 202 through input devices 226. Input devices 226 include, but are not limited to, a pointing device (such as a mouse, trackball, stylus, or the like), a keyboard, a microphone, a gesture or touch input device, a voice input device, a joystick, a satellite dish, a scanner, a TV tuner card, a digital camera, a digital video camera, a web camera, or the like. The input devices 226 connect to the processing unit 204 through the system bus 208 via interface port(s) 228. Interface port(s) 228 include, for example, a serial port, a parallel port, a game port, and a universal serial bus (USB). Output device(s) 230 may also use the same types of ports as input device(s) 226. Thus, for example, a USB port may be used to provide input to the computer 202 and to output information from the computer 202 to an output device 230.

An output adapter 232 is provided to illustrate that there are some output devices 230 like monitors, speakers, and printers, among other output devices 230, which are accessible via the output adapters 232. The output adapters 232 include, by way of illustration and not limitation, video and sound cards that provide a means of connection between the output device 230 and the system bus 208. It can be noted that other devices and/or systems of devices provide both input and output capabilities, such as remote computer(s) 234.

The computer 202 can be a server hosting an event forecasting system in a networking environment, such as the networking environment 100, using logical connections to one or more remote computers, such as remote computer(s) 234. The remote computer(s) 234 may be client systems configured with web browsers, PC applications, mobile phone applications, and the like. The remote computer(s) 234 can be a personal computer, a server, a router, a network PC, a workstation, a microprocessor based appliance, a mobile phone, a peer device or other common network node and the like, and typically includes many or all of the elements described relative to the computer 202. For purposes of brevity, the remote computer(s) 234 is illustrated with a memory storage device 236. Remote computer(s) 234 is logically connected to the computer 202 through a network interface 238 and then physically connected via a communication connection 240.

Network interface 238 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 240 refers to the hardware/software employed to connect the network interface 238 to the system bus 208. While communication connection 240 is shown for illustrative clarity inside computer 202, it can also be external to the computer 202. The hardware/software for connection to the network interface 238 may include, for example, internal and external technologies such as mobile phone switches, modems including regular telephone grade modems, cable modems and DSL modems, ISDN adapters, and Ethernet cards.

Method for Modeling Data Generating Process

Figure 3:
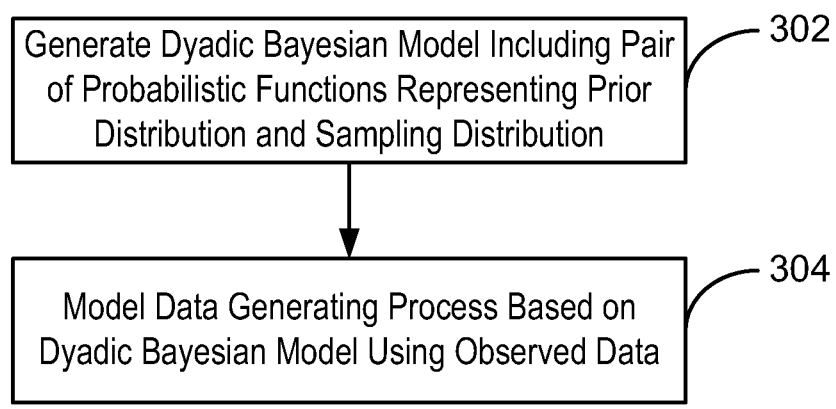
FIG. 3 is a process flow diagram of a method for modeling a data generating process.

FIG. 3 is a process flow diagram of a method for modeling a data generating process. The method 300 may be implemented by any suitable type of computing device. For example, the method 300 may be implemented within the networking environment 100 or the computing environment 200 discussed above with respect to FIGS. 1 and 2.

The method begins at block 302, at which a dyadic Bayesian model including a pair of probabilistic functions representing a prior distribution and a sampling distribution is generated. The prior distribution may be generated by computing a probability density function of a prior function corresponding to the dyadic Bayesian model, and the sampling distribution may be generated by computing a probability density function of a generation function, i.e., gen function, corresponding to the dyadic Bayesian model. Alternatively, the prior distribution may be generated by computing a probability mass function of the prior function, and the sampling distribution may be generated by computing a probability mass function of the gen function corresponding to the dyadic Bayesian model. The dyadic Bayesian model may be generated using type parameters, including general parameters, hyperparameters, input parameters, and output parameters, or any combinations thereof. The dyadic Bayesian model may be a generic Bayesian model that may be used to model any of a number of different kinds of data sets. In addition, the dyadic Bayesian model may be generated using any suitable programming language, such as a probabilistic programming language.

The dyadic Bayesian model may be automatically generated, chosen from a library of previously-generated dyadic Bayesian models, or manually written in a particular probabilistic programming language. Further, the dyadic Bayesian model may be generated based on one or more previously-generated dyadic Bayesian models using a model combinator. The model combinator may be a mixture model combinator or an identically and independently distributed array (IIDArray) model combinator, for example.

At block 304, a data generating process is modeled based on the dyadic Bayesian model using observed data. This may be accomplished by generating a learner object for the dyadic Bayesian model and training the dyadic Bayesian model with the learner object based on the observed data to produce a trained dyadic Bayesian model. A posterior distribution over parameters may be generated based on the trained dyadic Bayesian model. In addition, a posterior predictive distribution may be generated based on the posterior distribution. The posterior predictive distribution may be used to predict an outcome of observable variables. For example, the posterior predictive distribution may be used to predict a distribution of new output data based on the new input data.

In various embodiments, a sampler object for the dyadic Bayesian model may be generated. The sampler object may be used to test the learner object by computing synthetic data for the dyadic Bayesian model and using the synthetic data to judge the accuracy of the posterior distribution or the posterior predictive distribution. In addition, an inference engine may be used to execute the learner object and the sampler object.

The method 300 is not intended to indicate that the steps of the method 300 are to be executed in any particular order, or that all of the steps of the method 300 are to be included in every case. Further, any number of additional steps may be included within the method 300, depending on the details of the specific implementation. For example, the dyadic Bayesian model may be reused to model any number of additional data generating processes.

The dyadic Bayesian model is described herein with respect to a specific F# probabilistic programming language referred to as "Fun." However, it is to be understood that the dyadic Bayesian model may be written in any other suitable type of programming language, depending on the details of the specific implementation.

Fun is a first-order functional language with no recursion. The implementation of Fun described herein supports a probabilistic programming language, with arrays and array comprehensions, and Vector and Matrix types. The value c may range over constant data of base and unit type, the value n may range over integers, and the value r may range over real numbers. The equation $ty(c)=t$ may indicate that constant c has type t. The following expression may represent the values of Fun.

$$U,V::=x|c|(V,V)|inl\ V|inr\ V$$

The base types of Fun may be expressed as shown below.

$$a,b::=int|double$$

In addition, the following expression may represent the compound type of Fun.

$$t,u::=unit|b|(t_1*t_2)|(t_1+t_2)$$

Let $bool \triangleq unit+unit$. A collection of deterministic functions on these types may be assumed to be valid, including arithmetic and logical operators, and fst and snd projection on pairs. Each operation f of arity n has a signature of the form val $f:t_1* \ldots *t_n \rightarrow t_{n+1}$. The standard families of primitive probability distributions of type $PDist\langle t\rangle$, including the Bernoulli distribution, the Beta distribution, the Gaussian distribution, and the Gamma distribution, may also be assumed to be valid. The Bernoulli distribution is as shown below in the following expression.

$$(bias:double) \rightarrow PDist\langle bool\rangle$$

The Beta distribution may be expressed as shown below.

$$(a:double*b:double) \rightarrow PDist\langle double\rangle$$

The Gaussian distribution is as shown below in the following expression.

(mean:double*precision:double)→PDist⟨double⟩

The Gaussian distribution may be parameterized by mean and precision. The standard deviation σ follows from the identity σ²=1/precision. The Gamma distribution may be expressed as shown below.

(shape:double*scale:double)→PDist⟨double⟩

An expression of Fun may be represented by M or N. A value of Fun may be represented by U or V. An expression for deterministic function application may be represented by $f(V_1, \ldots, V_n)$. A let-expression may be represented by let x=M in N. A match-expression may be represented by match V with inl x:M|inr y:N. A primitive distribution may be represented by random (Dist(V)), and an observation may be represented by observe V.

The notation Γ⊢M:t may indicate that, in type environment $\Gamma = x_1:t_1, \ldots, x_n:t_n$ ($x_i$ distinct), expression M has type t. A number of typing rules may be used for Fun expressions in the case of Γ⊢M:t.

Formally, the semantics of a closed Fun expression M is a measure M[[M]] over its return type. If M contains no instance of observe, then M[[M]] is a probability distribution. Otherwise, it is a measure of model evidence conditional on the observations, which may sum to more or less than 1. For simplicity, Fun expressions may be considered as defining probability distributions and using conventional mathematical notations for probability.

Fun is designed as a subset of the F# programming language. Thus, Fun's expressions may be represented using the features for reflection found in the F# programming language, including quotation, evaluation, and anti-quotation. A closed term M of type t may be represented by the F# quotation ⟨ @M@⟨ of F# type Expr⟩ t⟩. More generally, if $x_1: t_1, \ldots, x_n:t_n \vdash M:t$, then M may be represented by F# quotation ⟨ @fun $(x_1, \ldots, x_n)$→M@⟩. The term E may represent a quotation. The F# expression E. Eval may evaluate E to its value and, inside a quotation, the % symbol denotes the anti-quotation.

An inference engine may be an algorithm that, given a quotation of a Fun expression of type t, returns an approximate representation of a distribution on t. An inference engine may be represented as a function Expr⟨t⟩→DistT, where DistT is the type of the representation.

As discussed above, a Bayesian model includes a prior distribution p(w|h) over parameter w and a sampling distribution p(y|x,w) over output y given input x and parameter w. The sampling distribution may also be referred to a "likelihood function." The prior distribution may represent uncertain beliefs about the parameters, given the hyperparameters h. The sampling distribution may represent a view of how the output y is produced from the input x, given the parameter w.

As an example, a linear regression problem may be considered. Linear regression involves finding a line that fits a given set of points. The input data may be represented by d=(x,y), where $x=[[x_1, \ldots, x_n]]$, and $y=[[y, \ldots, y_n]]$ are arrays of coordinates. A noisy line $y_i = Ax_i + B + \epsilon$ may be fit to the data, where the noise E is drawn from a Gaussian distribution with mean 0 and precision P.

The expression prior h shown below expresses the initial uncertainty about the parameters A, B, and P of the noisy line, where the hyperparameter h provides parameters for these distributions.

let prior h={A=random(Gaussian(h.MeanA,h.PrecA))
    B=random(Gaussian(h.MeanB,h.PrecB))
    P=random(Gamma(h.Shape,h.Scale))}

The generation function gen (w,x) shown below may define how to generate each $y_i$ from $x_i$ and parameters w.

let gen(w,x)=[[for xi in x→(w.A*xi)+w.B+random
    (Gaussian(0.0,w.P)]]

The previous expressions formalize the prior and sampling distributions. The prior distribution p(w|h) is the density of M[[prior h]] at w, while the sampling distribution p(y|x,w) is the density of M[[gen(w,x)]] at y.

Given prior and likelihood, by marginalizing the parameters, the predictive distribution for the output may be written as shown below in Eq. 1.

$$p(y|x,h) = \int p(y|x,w)p(w|h)dw \quad (1)$$

The predictive distribution may be sampled from by choosing h and input x as shown by the F# outputs of the following expressions.

val h = {MeanA = 0.0; PrecA = 1.0;
    MeanB = 5.0; PrecB = 0.3; Shape = 1.0; Scale = 1.0} val x = [[0.0; 1.0; 2.0; 3.0; 4.0; 5.0]]

First, w may be sampled from the prior distribution w=prior h, and then the output y=gen(w,x).

val w={A=0.70;B=4.33;P=0.58}//sampled prior(h)

val x=[[4.85;5.19;7.36;4.49;8.10;8.06]]//sampled gen (w,x)

Given observed data d=(x,y), via Bayes' Rule, a posterior distribution may be obtained as shown below in Eq. 2.

$$p(w|d,h) = \frac{p(y|x,w)p(w|h)}{p(d|h)} \quad (2)$$

The normalization constant $p(d|h) = \int p(y|x,w)p(w|h)dw$ is known as the evidence or marginal likelihood. The posterior predictive distribution may also be obtained as shown below in Eq. 3.

$$p(y'|x',d,h) = \int p(y'|x',w)p(w|d,h)dw \quad (3)$$

The posterior distribution and the posterior predictive distribution may be expressed as Fun expressions, using observe to condition on the data(x,y). The expressions for the posterior distribution and the posterior predictive distribution are shown below.

let posterior(h,x,y)=let w=prior h in observe(y=gen(w, x));w let predictive(h,x,y,x')=let w=posterior(h,x,y)
    in gen(w,x')

Using a particular inference engine for Fun, concrete representations of the normalized distributions may be obtained. For example, the parameters used to generate sample data y may be inferred. By running an Infer.NET implementation of Fun to compute the distribution posterior(h,x,y), the result shown below may be obtained. As used herein, the term "Infer.NET" refers to a probabilistic programming system that generates scalable inference algorithms based on message-passing factor graphs.

{A=Gaussian(0.5576;0.05089);//actual A=0.70;

B=Gaussian(4.936;0.404);//actual B=4.33;

N=Gamma(1.695,0.46)[mean=0.78];}//actual P=0.58

The precision of A may be low, indicating uncertainty. Given a new input x'=[[6.0; 7.0; 8.0; 9.0]] the distribution predictive (h,x,y,x') may be computed to obtain the following expression.

[[ Gaussian(8.282, 5.383); Gaussian(8.839, 6.045); Gaussian(9.397, 6.808); Gaussian(9.954, 7.673) ]]

Thus, a noisy line may be modeled by distributions written as Fun expressions prior h and gen(w,x). These expressions may be executed to draw samples from the predictive distribution, so as to create a synthetic dataset d=(x,y). Fun expressions for the posterior distribution and the posterior predictive distribution may be written, and an inference engine may be executed to learn the posterior and make predictions based on new data.

In general, a dyadic Bayesian model may be a value of the record type Model⟨TH, TW, TX, TY⟩, wherein the type parameters correspond to the different data of a Bayesian model. Specifically, the hyperparameters h are represented by TH, and the parameters w are represented by TW. The inputs x are represented by TX, and the outputs y are represented by TY. The dyadic Bayesian model may then be written as shown below.

```
type Model⟨'TH,' TW,' TX,' TY⟩ =
   {Prior: Expr⟨'TH → 'TW⟩
    Gen: Expr⟨'TW * 'TX →' TY⟩ }
```

Given a model m and hyperparameter h, the closed Fun expression % m. Prior h is the prior distribution p(w|h), while the Fun expression % m. Gen(w,x) is the sampling distribution p(y|x,w). The linear regression code may be packaged as a typed model M1 as shown below, wherein the F# quotations ⟨@ ... @⟩ is used to treat the bodies of prior and gen as Fun expressions.

```
module LinearRegression =
   type TH = {MeanA: double; PrecA: double; ... }
   type TW⟨'TA,' TB,' TN⟩ = {A:' TA; B:' TB; Noise:' TN }
   type TX = double[ ]
   type TY = double[ ]
   let M1 = {Prior = ⟨ @prior@ ⟩ ; Gen = ⟨ @gen@ ⟩ }
      : Model⟨TH, TW⟨double, double, double⟩ , TX, TY⟩
```

Given any model m and hyperparameter h, a new sampler S may be constructed by first sampling w from p(w|h) and then providing an object S such that the property S.Parameters: TW is the sample w, and such that the method S.Sample(x):TY samples the sampling distribution p(y|x,w). The sampler interface may be represented as shown below.

```
type ISampler⟨'TW,' TX, 'TY⟩ = interface
   abstract Parameters: 'TW
   abstract Sample: x:' TX →' TY
end
```

A sampler for model m with hyperparameter h may then be written according to the following expression.

```
let w = m. Prior. Eval ( ) h // choose w given prior and h
let gen w = ⟨ @fun x → (%m. Gen) (w, x)@⟩ . Eval( )
{new ISampler⟨'TW,' TX,' TY⟩ with
   member s. Parameters = w
   member s. Sample (x) = gen w(x)
end}
```

Given any model m, hyperparameter h, and an inference engine, a new learner L may be constructed with the learner interface shown below.

```
type ILearner⟨'TDistW,' TX, 'TY, 'TDistY⟩ = interface
   abstract Train: x: 'TX * y:' TY → unit
   abstract Posterior: unit →' TDistW
   abstract Predict: x:' TX → 'TDistY
end
```

The type 'TDistW represents distributions over parameter 'TW, while the type 'TDistY represents distributions over output 'TY. Different learners may use different representations.

A Fun quotation can be thought of as a representation of a conditional distribution on its return type, independent of any inference engine. Using this idea, the reference learner L for model m with hyperparameters h shown below may be derived. The reference learner captures the semantics of the application programming interface (API) described herein by assembling suitable quotations. The mutable variable d holds a Fun expression representing the current parameter distribution, initially the posterior. Each call to Train updates d by conditioning with the training data. Calls to Posterior and Predict return suitable quotations for the posterior and predictive distributions.

```
let d = ref⟨ @(%m. Prior)h @⟩
   {new ILearner⟨Expr⟨ 'TW⟩ , 'TX, 'TY,
    Expr⟨'TY⟩ ⟩ with
      member l. Train (x: 'TX, y: 'TY) =
         d := ⟨ @let w = (% ! d)in
         observe (y = ((%m. Gen) (w, x))) w@⟩
      member l. Posterior( ): Expr⟨'TW⟩ = (! d)
      member l. Predict(x:' TX): Expr⟨'TY⟩ =
         ⟨ @let w = (% ! d)in (%m. Gen) (w, x)@⟩ }
```

After N calls to Train with arguments d={$(x_i,y_i)$}$_{i=1}^N$, L. Posterior represents the posterior distribution p(w|d,h), and L. Predict(x') represents the posterior predictive distribution p(y'|x',d,h). Thus, the reference learner can be used to compute the posterior distribution and the posterior predictive distribution.

A sampler and a learner may be used to test whether an inference engine can recover known parameters from synthetic data. Consider a learner L, constructed from a model m with hyperparameters h, and an inference engine. Given an input x, the effectiveness of L may be tested by constructing a new sampler S for m and h, and executing code corresponding to the following expression.

```
let w: TW = S. Parameters // fixed parameters
L. Train(x, S. Sample(x)) // train on synthetic data
let wD: TDistW = L. Posterior( ) // inferred distribution on w
... // test how probable w is according to wD
```

The details of the final test depend on TW and TDistW.

If it is assumed that the data is a collection $d=\{(x_i,y_i)\}_{i=1}^N$ of IID observations, the sampling distribution factorizes according to Eq. 4.

$$p(\{y_i\}_{i=1}^N | \{x_i\}_{i=1}^N, w) = \Pi_{i=1}^N p(y_i | x_i, w) \qquad (4)$$

This results in the generation of an IIDArray model combinator, as shown below. Given a model that sends TX to TY, IIDArray builds a new model with the same prior, but which sends TX[ ] to TY[ ]. Learning with any model built from this combinator is an instance of batch learning, where multiple data items are processed simultaneously.

```
module IIDArray =
  let M (m: Model⟨'TH,' TW,' TX,' TY⟩ ) =
    {Prior = m. Prior
     Gen = ⟨ @fun(w, xs) → [[for x in xs → (%m. Gen) (w, x)]] @⟩ }
    : Model⟨'TH,' TW,' TX[ ],' TY[ ]⟩
```

In various embodiments, the IIDArray model combinator is used to obtain a new model from a previous model.

According to embodiments described herein, mixture models, evidence-based model averaging, and mixtures of experts may also be used as model combinators. For example, given a number of models $m_k$ with k=1 . . . K with the same types of parameters x and data y, a mixture of these models can be created by introducing an independent indicator variable z that indicates the mixture component $m_k$ from which the data was generated. This composition may be helpful for instances in which the data can be generated in several ways, and a good estimate of the number of models and the probability for data to be drawn from each model is known. The sampling distribution for model k may be as shown below in Eq. 5, where the parameters are represented by $w_k$ and the hyperparameters are represented by $h_k$.

$$p(y|x, w_1, \ldots, w_K) = \Sigma_{k=1}^K p(z=k) p(y|x, m_k, w_k) \qquad (5)$$

In general, a mixture model combinator that may be used to generate a new model based on a mixture of two previously-generated models is shown below.

```
let M (m1: Model⟨'TH1,' TW1,' TX,' TY⟩,
       m2: Model⟨'TH2,' TW2,' TX,' TY⟩, p: double)
  : Model⟨('TH1 *' TH2), ('TW1 *' TW2),' TX,' TY⟩ =
  {Prior = ⟨ @fun(h1, h2) → (%m1. Prior)h1, (%m2. Prior)h2 @⟩
   Gen = ⟨ @fun((w1, w2), x) →
     if random(Bernoulli(p))then (%m1. Gen) (w1, x)
     else (%m2. Gen) (w2, x)@⟩ }
```

Model evidence is the likelihood of a particular model given a set of observations. Model evidence may be used to choose between different models of the same data, or may be used as an objective function to increase the efficiency of particular inference techniques, for example. Model averaging involves taking some prior belief p ($m_k$|h) about how likely each model $m_k$ is and updating this belief based on evidence of each model given the data, as shown below in Eq. 6.

$$p(x|y,h) = \Sigma_k p(x|y, m_k, h_k) p(m_k|h) \qquad (6)$$

In general, a model averaging combinator that may be used to generate a new model based on previously-generated models is shown below.

```
let M(m1: Model⟨'TH1,' TW1,' TX,' TY⟩,
      m2: Model⟨'TH2,' TW2,' TX,' TY⟩ )
  : Model⟨(double * 'TH1 *' TH2), (bool *' TW1 *' TW2), 'TX, 'TY⟩ =
  {Prior =
     ⟨ @fun (bias, h1, h2) →
       random(Bernoulli(bias)), (%m1. Prior)h1, (%m2. Prior)h2@⟩
   Gen = ⟨ @fun((switch, w1, w2), x) →
     if switch then (%m1. Gen) (w1, x)
     else (%m2. Gen) (w2, x)@⟩ }
```

According to a mixture of experts process, a gating model p(z|x,w) may be used to decide, for each input x, the corresponding output y. For example, the binary case with two data models $m_k$ with k∈{T, F}, conditional sampling distributions $p(y|x, m_k, w_k)$, priors $p(w_k|h_k)$, and gating model p(z|x,w) with prior p(w|h) may be considered. The resulting combined sampling distribution may be as shown below in Eq. 7.

$$p(y|x, w_T, w_F, w) = \Sigma_{k \in \{T,F\}} p(z=k|x,w) p(y|x, m_k, w_k) \qquad (7)$$

A combined prior may also be obtained, as shown below in Eq. 8.

$$p(w, w_F, w_T | h, h_T, h_F) = p(w|h) p(w_T|h_T) p(w_F|h_F) \qquad (8)$$

In general, a mixture of experts combinator that may be used to generate a new model based on previously-generated models is shown below.

```
let M(mc: Model⟨'TH,' TW,' TX, bool⟩,
      m1: Model⟨'TH1,' TW1,' TX,' TY⟩,
      m2: Model⟨'TH2,' TW2,' TX,' TY⟩ )
  : Model⟨'TH *' TH1 * TH2, 'TW *' TW1 *' TW2,' TX, 'TY⟩ =
  {Prior = ⟨ @fun((hc, h1, h2), x) →
     (%mc. Prior)hc, (%m1. Prior)h1, (%m2. Prior)h2 @⟩
   Gen = ⟨ @fun((wc, w1, w2), x) →
     if (%mc. Gen) (wc, x)then (%m1. Gen) (w1, x)
     else (%m2. Gen) (w2, x)@⟩ }
```

According to embodiments described herein, any of the model combinators discussed above may be used to model data generating processes. Such data generating processes may relate to a wide range of machine-learning tasks, such as regression, classification, topic modeling, and the like.

Embodiments described herein provide for the use of various different types of learners. For example, learners that are based on Algebraic Decision Diagrams (ADDs), message-passing, or Markov chain Monte Carlo (MCMC) techniques may be implemented. In the case of a learner based on MCMC techniques, the density of the posterior function for a specific model may be automatically generated.

System for Modeling Data Generating Process

Figure 4:
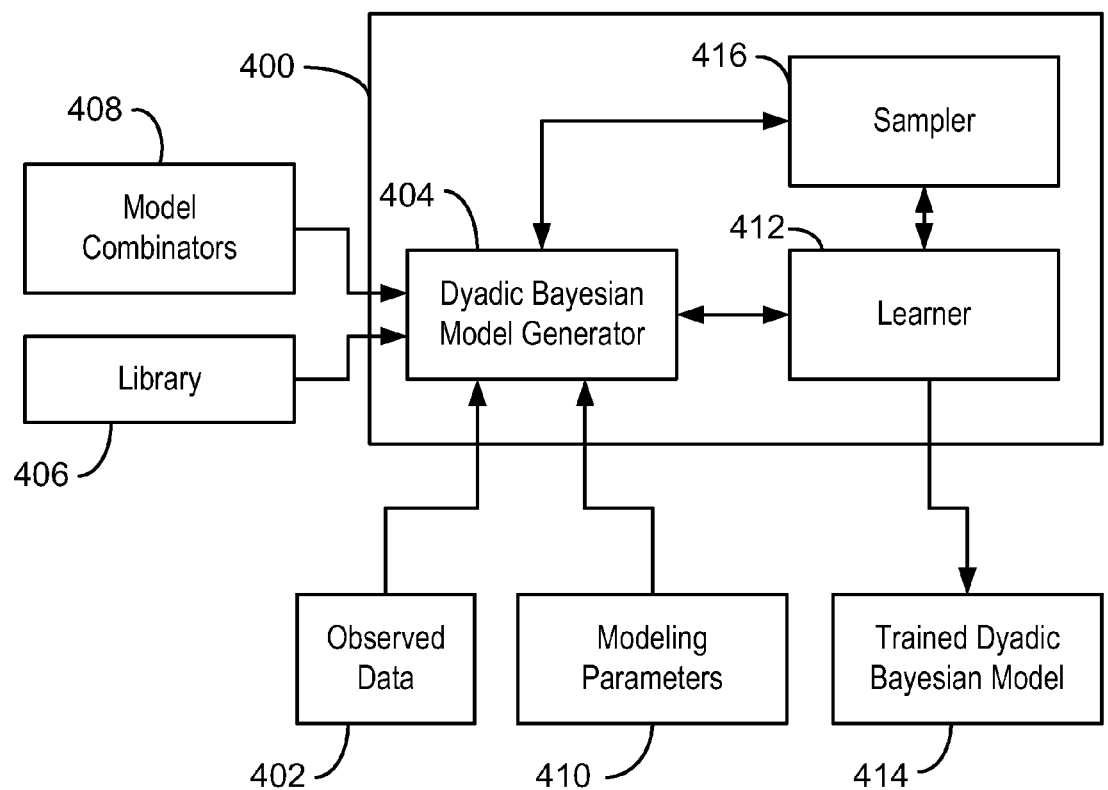
FIG. 4 is a block diagram of a system for modeling a data generating process.

FIG. 4 is a block diagram of a system 400 for modeling a data generating process. Specifically, the system 400 may be used to model a data generating process for observed data 402 based on a dyadic Bayesian model. The system 400 may be implemented within any suitable type of computing device, such as a desktop computer, laptop computer, server, mobile computing device, or the like.

The system 400 may include a dyadic Bayesian model generator 404. The dyadic Bayesian model generator 404 may be adapted to generate a dyadic Bayesian model including a pair of probabilistic functions representing a prior distribution and a sampling distribution. The dyadic Bayesian model generator 404 may automatically generate the dyadic Bayesian model, select the dyadic Bayesian model from a library 406 of previously-generated dyadic Bayesian models, or manually write the dyadic Bayesian model in a particular programming language. In addition, the dyadic Bayesian model generator 404 may generate the dyadic Bayesian model based on one or more previously-generated dyadic Bayesian models using one or more model combinators 408. In some embodiments, the dyadic Bayesian model generator 404 may generate the dyadic Bayesian model based on specific modeling parameters 410.

A learner 412 may model the observed data 402 based on the generated dyadic Bayesian model. Specifically, the learner 412 may train the dyadic Bayesian model based on the observed data 402 and the modeling parameters 410 to produce a trained dyadic Bayesian model 414. A posterior distribution over the modeling parameters 410 may be generated based on the trained dyadic Bayesian model 414, and a posterior predictive distribution may be generated based on the posterior distribution. An outcome of observable variables may then be predicted based on the posterior predictive distribution of the trained dyadic Bayesian model 414.

In addition, a sampler 416 may be used to test the learner 412 by computing synthetic data for the dyadic Bayesian model and using the synthetic data to judge an accuracy of the posterior distribution or the posterior predictive distribution. In some embodiments, if the sampler 416 identifies any errors or issues with the trained dyadic Bayesian model 414, the learner 412 may be directed to retrain the dyadic Bayesian model. Further, in various embodiments the learner 412 and the sampler 416 are implemented by an inference engine (not shown).

The block diagram of FIG. 4 is not intended to indicate that the data modeling system 400 of FIG. 4 is to include all the components shown in FIG. 4. Further, any number of additional components not shown in FIG. 4 may be included within the system 400.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for modeling a data generating process, comprising:
    generating a dyadic Bayesian model comprising a pair of probabilistic functions representing a prior distribution and a sampling distribution; and
    modeling a data generating process based on the dyadic Bayesian model using observed data, wherein modeling the data generating process further comprises:
        generating a learner object for the dyadic Bayesian model;
        training the dyadic Bayesian model with the learner object based on the observed data to produce a trained dyadic Bayesian model;
        generating a posterior distribution over parameters based on the trained dyadic Bayesian model;
        generating a posterior predictive distribution based on the posterior distribution; and
        predicting an outcome of observable variables based on the posterior predictive distribution.

2. The method of claim 1, comprising:
    generating a sampler object for the dyadic Bayesian model; and
    using the sampler object to test the learner object by computing synthetic data for the dyadic Bayesian model and using the synthetic data to judge an accuracy of the posterior distribution or the posterior predictive distribution.

3. The method of claim 1, comprising generating a new dyadic Bayesian model based on one or more previously-generated dyadic Bayesian models using a model combinator.

4. The method of claim 1, comprising generating the prior distribution by computing a probability density function of a prior function corresponding to the dyadic Bayesian model.

5. The method of claim 1, comprising generating the sampling distribution by computing a probability density function of a generation function corresponding to the dyadic Bayesian model.

6. The method of claim 1, comprising generating the prior distribution by computing a probability mass function of a prior function corresponding to the dyadic Bayesian model.

7. The method of claim 1, comprising generating the sampling distribution by computing a probability mass function of a generation function corresponding to the dyadic Bayesian model.

8. The method of claim 1, comprising using a programming language to generate the dyadic Bayesian model.

9. A system for modeling a data generating process, comprising:
    a processor that is adapted to execute stored instructions; and
    a system memory, wherein the system memory comprises code configured to:
        generate a dyadic Bayesian model comprising a pair of probabilistic functions representing a prior distribution and a sampling distribution, a sampler object, and a learner object;
        train the dyadic Bayesian model based on observed data with the learner object to produce a trained dyadic Bayesian model;
        generate a posterior distribution over parameters based on the trained dyadic Bayesian model;
        generate a posterior predictive distribution based on the posterior distribution; and
        predict an outcome of observable variables using the posterior predictive distribution.

10. The system of claim 9, wherein the system memory comprises code configured to test the learner object with the sampler object by computing synthetic data for the dyadic Bayesian model and using the synthetic data to judge an accuracy of the posterior distribution or the posterior predictive distribution.

11. The system of claim 9, wherein the system memory comprises code configured to generate a new dyadic Bayesian model based on one or more previously-generated dyadic Bayesian models using a model combinator.

12. The system of claim 9, wherein the parameters comprise general parameters, hyperparameters, input parameters, or output parameters, or any combinations thereof.

13. The system of claim 9, comprising code configured to provide an inference engine for executing the sampler object and the learner object.

14. The system of claim 9, wherein the posterior predictive distribution of the data set comprises a distribution of output data within the data set based on input data within the data set.

15. The system of claim 9, wherein the observable variables comprise new input data, and wherein the posterior predictive distribution is used to predict new output data based on the new input data.

16. One or more computer-readable storage media comprising a plurality of instructions that when executed by a processor, cause the processor to:
generate a dyadic Bayesian model comprising a pair of probabilistic functions representing a prior distribution and a sampling distribution from one or more previously-generated dyadic Bayesian models using a model combinator;
model a data generating process by transforming data according to the dyadic Bayesian model;
generate a learner object for the dyadic Bayesian model;
train the dyadic Bayesian model with the learner object based on the observed data to produce a trained dyadic Bayesian model;
generate a posterior distribution over parameters based on the trained dyadic Bayesian model;
generate a posterior predictive distribution based on the posterior distribution; and
predict an outcome of observable variables based on the posterior predictive distribution.

17. The one or more computer-readable storage media of claim 16, wherein the model combinator comprises a mixture model combinator.

18. The one or more computer-readable storage media of claim 16, wherein the model combinator comprises an identically and independently distributed array (IIDArray) model combinator.

19. The one or more computer-readable storage media of claim 16, wherein the plurality of instructions cause the processor to generate a sampler object and a learner object for modeling the data generating process.

20. The one or more computer-readable storage media of claim 16, comprising using a programming language to generate the dyadic Bayesian model.

* * * * *